Nov. 3, 1925.  
F. G. SPENCER  
1,560,356  
COMBINED HYDRAULIC CLUTCH AND TRANSMISSION  
Filed April 8, 1924    4 Sheets-Sheet 1

Nov. 3, 1925.

F. G. SPENCER 1,560,356

COMBINED HYDRAULIC CLUTCH AND TRANSMISSION

Filed April 8, 1924    4 Sheets-Sheet 2

Inventor
F. G. Spencer
By Clarence A. O'Brien
Attorney

Nov. 3, 1925.  1,560,356
F. G. SPENCER
COMBINED HYDRAULIC CLUTCH AND TRANSMISSION
Filed April 8, 1924  4 Sheets-Sheet 3
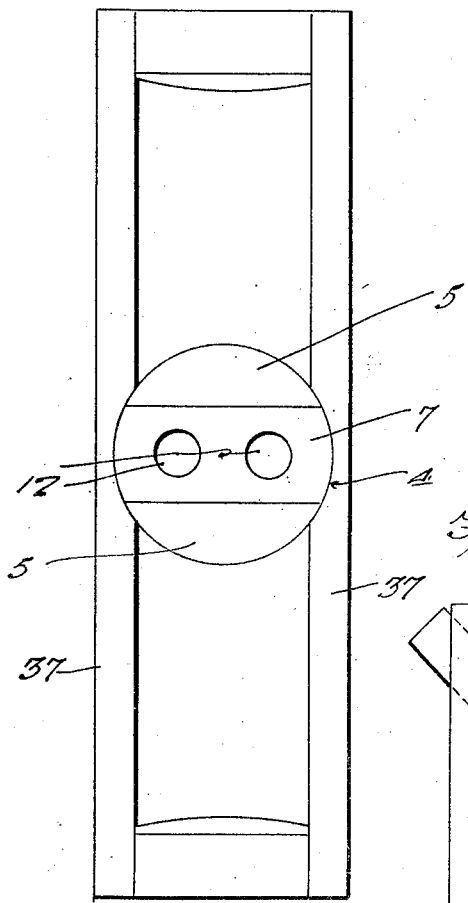
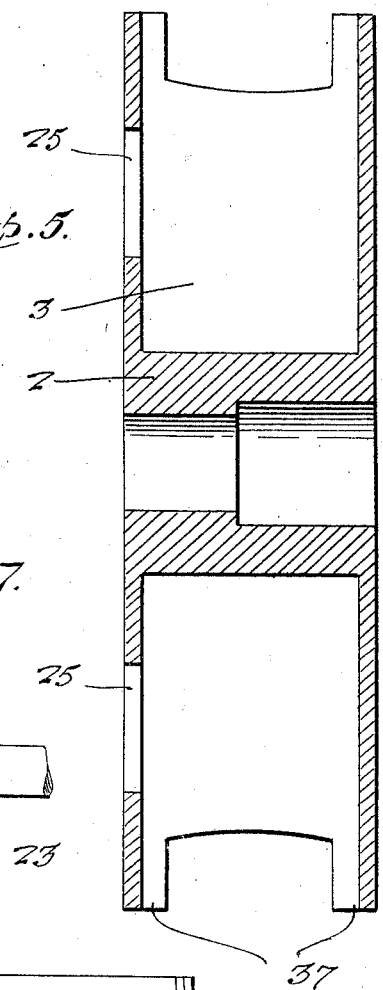
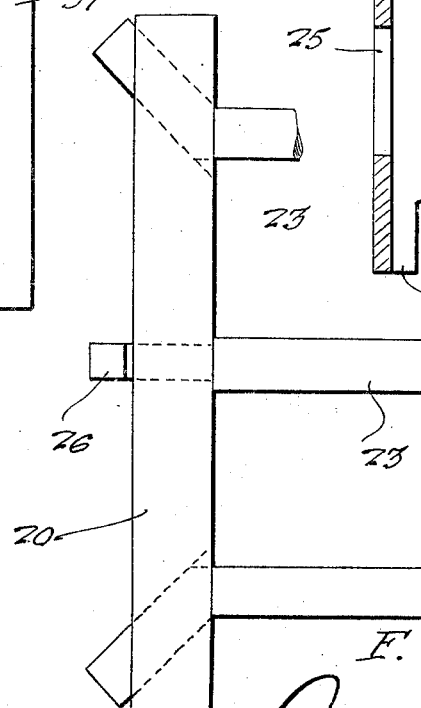
Inventor
F. G. Spencer
By Clarence A. O'Brien
Attorney Nov. 3, 1925.                                                    1,560,356
                         F. G. SPENCER
             COMBINED HYDRAULIC CLUTCH AND TRANSMISSION
                    Filed April 8, 1924        4 Sheets-Sheet 4
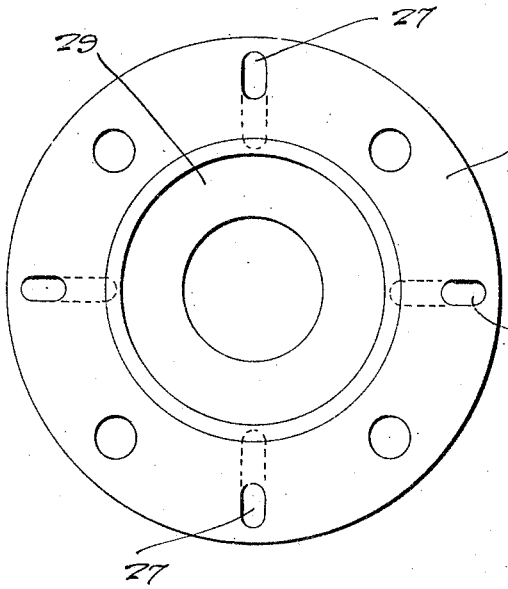
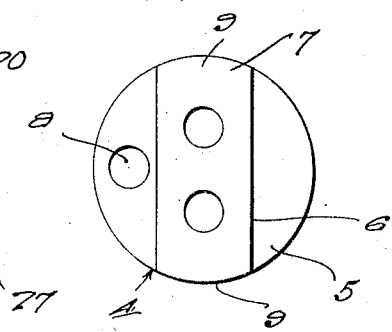
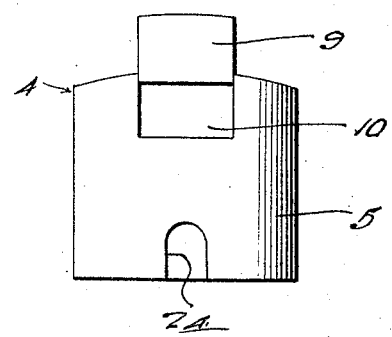
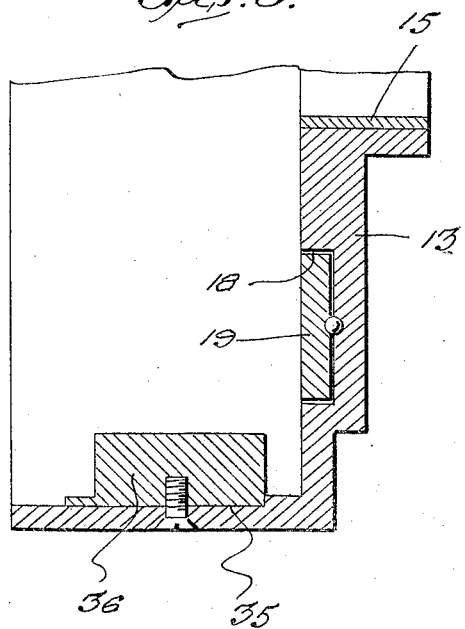
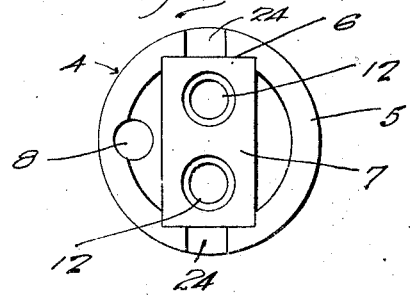
Inventor
F. G. Spencer
By Clarence A. O'Brien
Attorney Patented Nov. 3, 1925.

1,560,356

UNITED STATES PATENT OFFICE.

FLOYD G. SPENCER, OF FRIENDSHIP, NEW YORK.

COMBINED HYDRAULIC CLUTCH AND TRANSMISSION.

Application filed April 8, 1924. Serial No. 705,072

*To all whom it may concern:*

Be known that I, FLOYD G. SPENCER, a citizen of the United States, residing at Friendship, in the county of Allegany and State of New York, have invented certain new and useful Improvements in Combined Hydraulic Clutches and Transmissions, of which the following is a specification.

This invention relates to improvements in combined clutches and transmissions, and particularly to a combined hydraulic clutch and transmission for use in automobiles.

An object of the invention resides in providing a rotor mounted on the driving or crank shaft of the engine having means operable for effecting the driving of the casing or housing of the same which is fixedly mounted on the driven shaft, said means being manually controllable by a foot pedal adapted to be operated by the operator of a vehicle equipped with the invention.

Another object of the invention is to provide a rotor mounted on the crank shaft of an engine, and encased by a suitable rotatable casing which is adapted to be filled with a suitable fluid, and mounted on the driven shaft, radially projectable means being mounted in the rotor and operated by means movable axially of the driven member having a control pedal arranged for suitable operation by the driver of the vehicle.

Another object of the invention resides in providing a rotor on the crank shaft or driving shaft of the engine housed within a casing filled with a suitable fluid, said casing having cam members positioned therein for cooperation with projectable plungers carried by the rotor to effect a control of the fluid in the casing, and thereby control the relative rotation of the rotor with respect to the casing, means being provided which is axially movable of the shaft having cooperating connection with the plungers so that a movement in one direction will project the plungers, while a movement in the opposite direction will retract the plungers within the rotor, said means being operable by a foot pedal controlled by the driver of the vehicle.

The invention includes other objects and improvements in the details of construction and arrangement of the parts which is more particularly described in the following detailed description and claims, directed to a preferred form of the invention, it being understood, however, that variations may be made in this construction and arrangement of parts without departing from the spirit and scope of the invention as described and claimed.

In the drawings, forming a part of this application:

Figure 3 is a sectional view taken on the line 3—3 of Figure 1.

Figure 4 is an elevational view of the rotor.

Figure 5 is a sectional view through the body of the rotor with the plungers removed.

Figure 6 is an elevational view of the plunger operating plate.

Figure 7 is a side elevational view of the plunger operating plate shown in Figure 6, showing the pin for operating the plunger positioned in operative relation with the plate.

Figure 8 is a partial sectional view of a portion of the casing or housing for the rotor showing the manner of mounting the cam therein.

Figure 9 is a plan view of one of the plunger assemblies.

Figure 10 is a side elevation of the plunger assembly shown in Figure 9.

Figure 11 is a bottom plan view of a plunger assembly.

Figure 1:
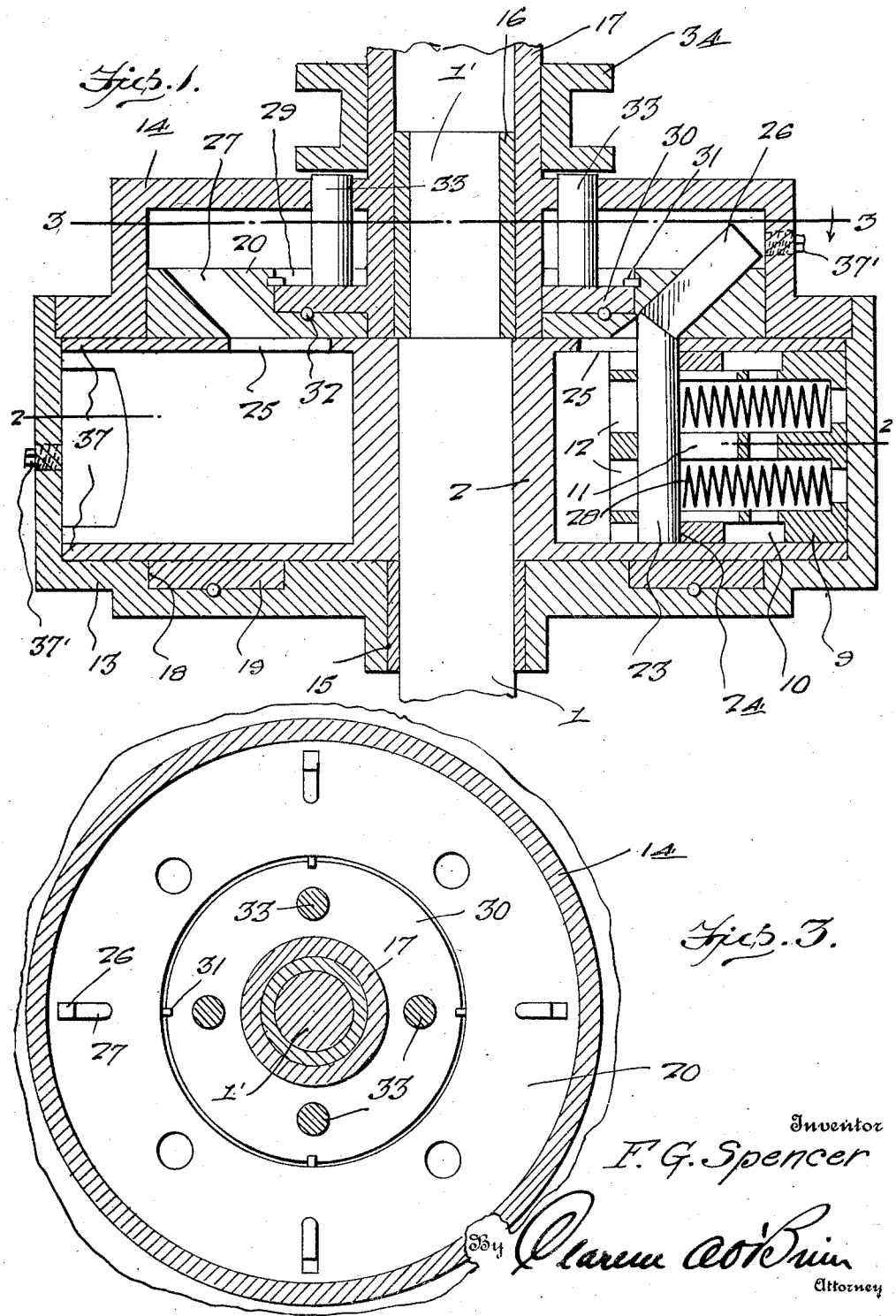
Figure 1 is a horizontal sectional view through the form of the clutch and transmission forming the subject of this invention.

The end of the driving or crank shaft of the motor is indicated at 1 and is provided with a reduced bearing extension 1' at the end thereof for a purpose which will presently appear.

The rotor assembly which is mounted on the crank shaft 1 includes a main body 2 of annular form keyed to the shaft for rotation therewith, said body being provided with a plurality of radially extending chambers 3 for the reception of plunger units 4. Each of these plunger units includes a stationary member 5 of cylindrical form having a tight fit in the cylindrical chambers 3 of the rotor, the outer end of the member 5 being closed and formed with a rectangular opening 6 which extends through the member for slidably receiving the plunger 7 therein. The outer end wall of the member 5 is also provided at one side of the opening 6 with a port 8 adapted to permit displacement of fluid from the chamber 3, when the plunger 7 is moved inwardly. The plungers 7 are each formed with lateral projections 9 from opposite sides thereof and the outer ends adapted to slide in the slots 10, in opposite sides of the stationary member 5. The inner ends of the plungers 7 are formed with transverse slots 11 and radial bores 12 form pockets for receiving compression springs.

A rotor casing is provided for housing the rotor assembly and is formed of a pair of sections 13 and 14 respectively, the section 13 having a bearing 15 adjacent the rotor assembly on the crank shaft 1, while the section 14 interfits in the annular flange receiving the rotor assembly of the section 13 and receives bearings at 16 on the bearing projection 1' of the crank shaft, said section 14 having a tubular shaft projection 17 therefrom, for receiving the end of the driven shaft. The casing section 13 is provided, in the end wall with an annular recess or channel 18 concentric with the shaft 1 which receives a thrust ring 19 provided with an annular groove corresponding with a groove in the channel 18 for receiving thrust bearings as clearly shown in Figure 1 of the drawing. An annular operating plate 20 is slidably mounted on the tubular shaft 17 of the section 14 of the casing, and a plurality of compression springs 21 are mounted in openings 22 in the body 2 of the rotor assembly, and seat at their ends against the thrust ring 19 and the operating plate 20 for normally forcing the operating plate away from the rotor for a purpose to be described. Operating pins 23 are extended through slots 24 in the stationary members 5 and the slots 11 of the plungers 7, one end of said pins extending through slots 25 extending through the wall of the rotor body and communicating with the chambers 3, the ends of the operating pins beyond the rotor being formed with operating extensions 26 which are inclined with respect to the remainder of the pin and are also directed outwardly relative to the shaft 1, said operating extensions seating for relative sliding movement in inclined bores 27 in the operating plate 20, so that an axial movement of the operating plate relative to the shaft 1 will cause a relative sliding movement of the operating pins and the operating extensions 26 through the bores 27, so that the pins will be moved inwardly to the shaft 1 or outwardly therefrom for retracting or projecting the plungers 7. Expansion springs 28 are mounted in the bores 12 for normally retaining the pins 23 at the bottom of the recesses or slots 11, which effects the projection of the plunger 7 in the position of the pin 23 as shown in Figure 1, into engagement with the casing section 13. The operating plate 20 is formed with an annular recess 29, concentric with the tubular shaft 17, and around said shaft for receiving an operating collar 30 retained in said recess by the retaining means indicated at 31, said collar being provided with a thrust bearing 32, opposed to the action of the springs 21 for preventing undue wear between the operating plate and the collar 30. This collar carries a plurality of extension pins 33 arranged parallel to the axis of the tubular shaft 17 and concentric thereto which extend through openings in the end walls of the casing section 14 and slidably project therethrough for engaging the operating yoke 34, which is slidable beyond the casing section 14 on the tubular shaft 17.

Suitable connections may be provided with this operating yoke adapted for operation by the driver of the vehicle equipped with the invention so that the operating collar 30 and the plate 20 may be pushed into close proximity with the rotor body 2 for projecting the plungers to contact with the surface of the casing section 13, the springs 21 normally forcing said operating plate 20, outwardly away from the body 2, so that the plungers are retracted from contact with the casing.

The casing section 13 is provided on the interior portion at diametrically opposite points with recess portions 35 adapted to receive operating cams 36 which are provided with flat faces adapted to extend into substantial contact at their central portions with the periphery of the rotor between the end flanges 37, and adapted in the rotation of the rotor in the casing and relative thereto for forcing the plungers 7 inwardly against the tension of the compression springs 28. Suitable filler plugs 37' are provided in the casing sections 13 and 14 in order that the assembled structure may be filled with oil or other suitable fluid.

Figure 2:
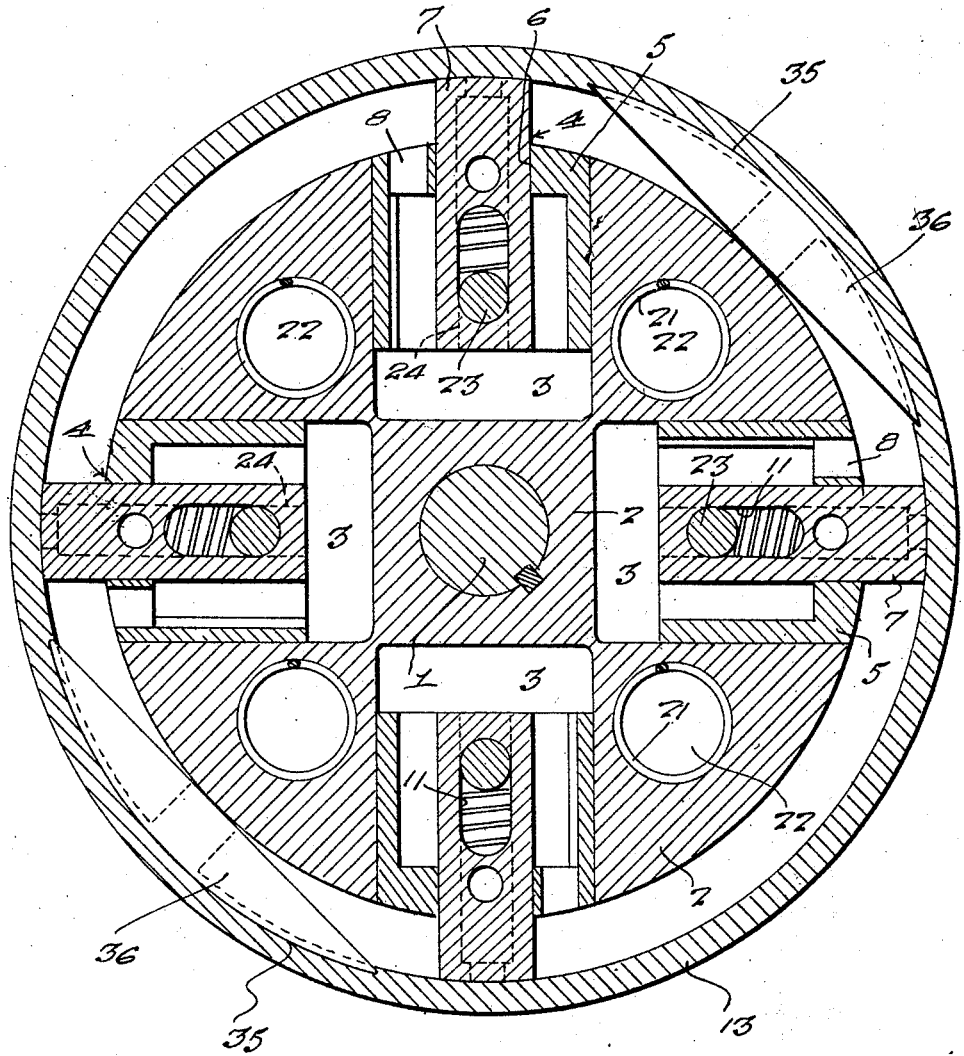
Figure 2 is a sectional view taken on the line 2—2 of Figure 1.
Figure 12:
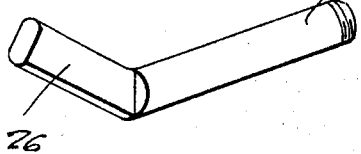
Figure 12 is a detail perspective view of one of the plunger operating pins.

With the clutch constructed and assembled as above described, and completely filled with oil, it will be clear that in the rotation of the shaft 1 by the motor of the vehicle, the springs 21 will normally force the operating plate 20 into a position against the end wall of the casing section 14, so that the operating extensions 26 of the pins 23 will be drawn relatively inward toward the shaft 1 for retracting or withdrawing the plungers 7 from contact with the casing section 13, so that the rotor may freely rotate within the casing and the oil therein freely flow during this action. If it is now desired to transmit the power of the shaft 1 to the hollow shaft 17, the yoke 34 is operated and through the pins 33 will direct a pressure against the operating collar 30 to force the operating plate 20 toward the rotor 2, which will effect an outward movement of the pins 23 from the shaft in an obvious manner for projecting the plungers 7 into contact with the casing, and as these plungers are projected, the free passage of the oil in the casing will be arrested by the projecting ends of the plungers beyond the periphery of the body 2, between the flanges 37, and a resistance will thereby be set up which will act on the cam 36 and effect a rotation of the casing and the tubular shaft 17. When the plungers are projected beyond the periphery of the body as shown in Figure 2, and a relative rotation between the rotor and casing takes place, the slots 11 in the plungers will permit the inward movement of the plungers when they ride over the cams 36, the springs 28 returning the plungers to contact with the casing, and when the plungers are in contact with the casing, as shown in Figure 2, the flow of oil will be entirely stopped, and a direct drive between the shaft 1 and the tubular shaft 17 will be effected as the flow of oil will be entirely stopped and pocketed between the cams 36 and the plungers 7.

It will therefore be seen that an efficient and combined hydraulic clutch and transmission has been provided wherein any ratio of speed between the rotor and casing may be obtained by the relative projection of the plungers 7, 7 from the periphery of the rotor and that a direct drive may also be effected when the plungers are projected to contact with the casing.

From the foregoing description, it will be clear that a simple and efficient form of clutch and transmission has been provided, for controlling the power between a drive shaft and a driven shaft which is operable for obtaining any ratio of speed desired between the shafts or for obtaining a direct drive of the driven shaft.

What is claimed is:

1. In combination, a drive shaft, a rotor body mounted on and for rotation with said drive shaft, said body being formed with a plurality of radially extending chambers opening through the periphery of said body, plunger assemblies having stationary members mounted in the chambers in said body, and slidable plungers in said stationary members adapted for projection or retraction from the periphery of the rotor body, said plungers being formed with transversely extending slots, operating pins projected through radial slots formed in the rotor body, the stationary member and the plunger slidable therein, resilient means seating against said pins and housed within radial bores in said plungers for normally effecting a projection of the plunger relative to the operating pin, said operating pins being provided with inclined operating extensions beyond said rotor body, an operating plate formed with inclined openings receiving said operating extensions, said plate being slidably mounted for axial movement relative to the drive shaft, a casing housing said rotor and having bearings on the drive shaft formed with a tubular driven shaft providing a slidable mounting for said operating plate, cam elements carried by said casing for cooperation with the plungers in projected relation from the rotor, said casing being adapted to contain fluid, and means for controlling the sliding movement of the operating plate normally adapted to project the plate in one direction to retract the plungers into the chambers of the rotor through the operation on the operating pin, said means being manually operable in the opposite direction to project said plungers outwardly beyond the periphery of said rotor for cooperation with the cams in the casing for controlling the flow of fluid therein to transmit power from the driving shaft to the driven shaft.

2. In a clutch of the class specified, a shaft, a rotor keyed to said shaft for rotation therewith, said rotor being provided with a radially disposed recess opening through its periphery and forming a lubricant pocket, a plunger assembly comprising a stationary part fitted into said pocket and closing the same, said stationary part being provided with a guide opening and with an oil port, and a spring pressed plunger passing slidably through said guide opening into said pocket, and a housing for said rotor and plunger assembly.

3. In a clutch of the class described, a driving shaft, a rotor keyed upon said shaft for rotation therewith, a housing in which said rotor is confined, a driven shaft upon which said housing is fixedly mounted, said housing and rotor being rotatable with respect to each other, spring projected plungers carried by said rotor and engageable with the peripheral wall of said housing, retracting pins for said plungers, there being a pin for each plunger and the pin being connected with the plunger and provided with an outwardly inclined extension, an operating plate for said pins arranged between the housing and rotor, said plate being provided with inclined bores in which the inclined extensions of said pins are slidably received, and means for moving said plate axially whereby to move said pins radially.

In testimony whereof I affix my signature.

FLOYD G. SPENCER.